(12) United States Patent
Sperber et al.

(10) Patent No.: US 6,250,171 B1
(45) Date of Patent: Jun. 26, 2001

(54) VARIABLE-RATIO GEAR TRANSMISSION HAVING TWO PARTIAL TRANSMISSIONS EACH HAVING A POWERSHIFT CLUTCH

(75) Inventors: Ralf Sperber, Wendlingen; Günter Wörner, Kernen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,526

(22) Filed: Dec. 23, 1999

(30) Foreign Application Priority Data

Dec. 24, 1998 (DE) .............................................. 198 60 251

(51) Int. Cl.[7] .................................................. F16H 19/00
(52) U.S. Cl. ................................................................ 74/331
(58) Field of Search ........................................ 74/330, 331

(56) References Cited

U.S. PATENT DOCUMENTS

| | | |
|---|---|---|
| 4,658,663 | 4/1987 | Hiraiwa . |
| 4,823,628 | 4/1989 | Hiraiwa . |
| 6,021,684 * | 2/2000 | Alfredsson .............................. 74/331 |

FOREIGN PATENT DOCUMENTS

| | | |
|---|---|---|
| 0 061 845 | 10/1982 | (EP) . |
| 2 235 503 | 3/1991 | (GB) . |

* cited by examiner

Primary Examiner—Dirk Wright
(74) Attorney, Agent, or Firm—Kenyon & Kenyon

(57) ABSTRACT

In a variable-ratio gear transmission, an input shaft is connected to output shaft by two partial transmissions each having an intermediate shaft, and the intermediate shafts are connected to the input shaft each by a powershift clutch. The intermediate shafts are connected for their part to a common countershaft by gear stages that are each associated to one gear, the countershaft being connected to the output shaft by a gear constant. In order to make possible a multiplicity of double shifts while skipping gears, the partial transmissions each have associated to them an auxiliary gear stage, whose gear ratio is equal to the gear ratio of a gear stage belonging, in each case, to the other partial transmission. The auxiliary gear stages are combined into one single gear stage through the mediation of an auxiliary countershaft, so that a main shaft gearwheel, connected by two gear-type clutches to the two intermediate shafts, engages with two idlers mounted, in each case, on one of the countershafts.

15 Claims, 3 Drawing Sheets

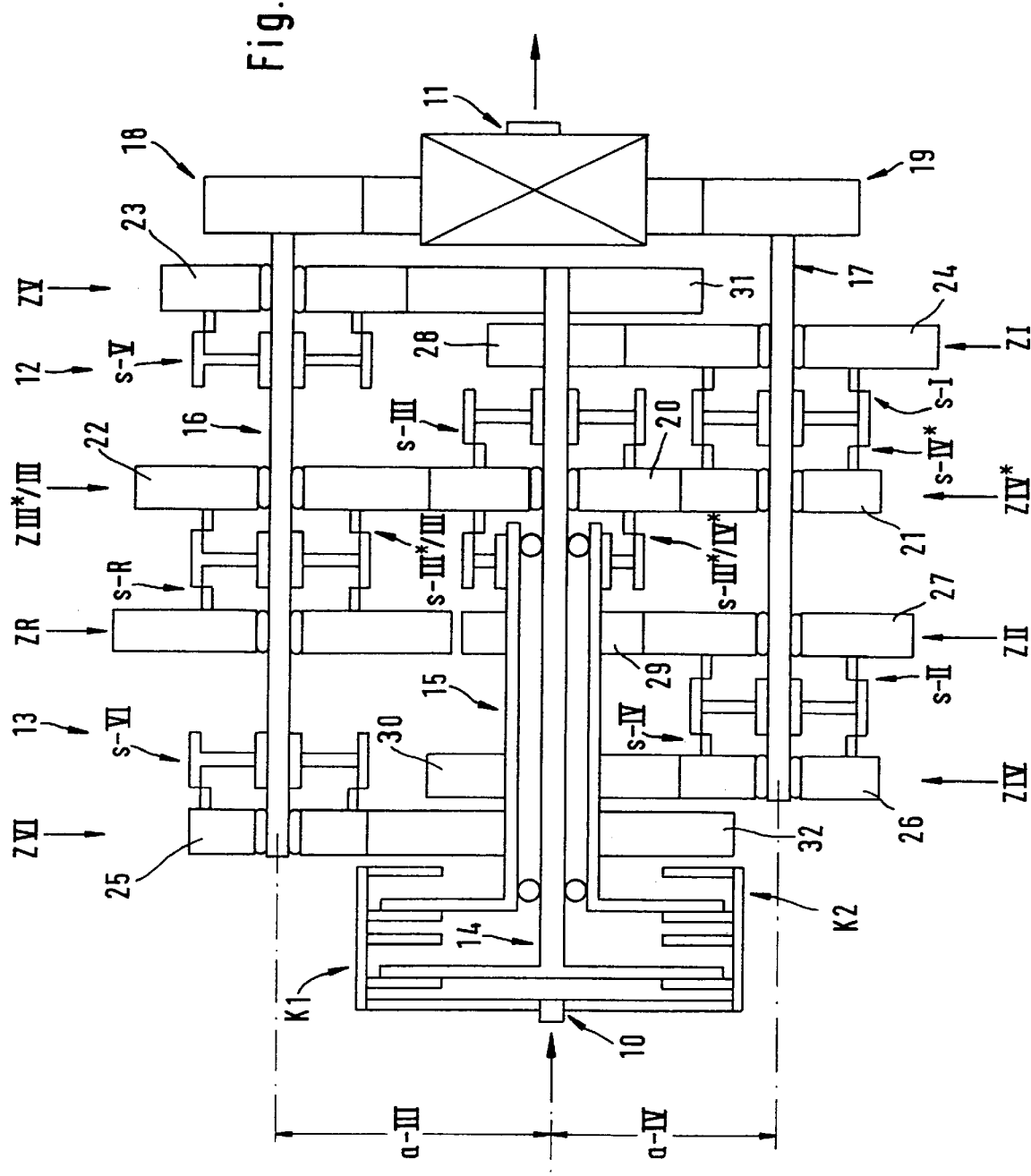

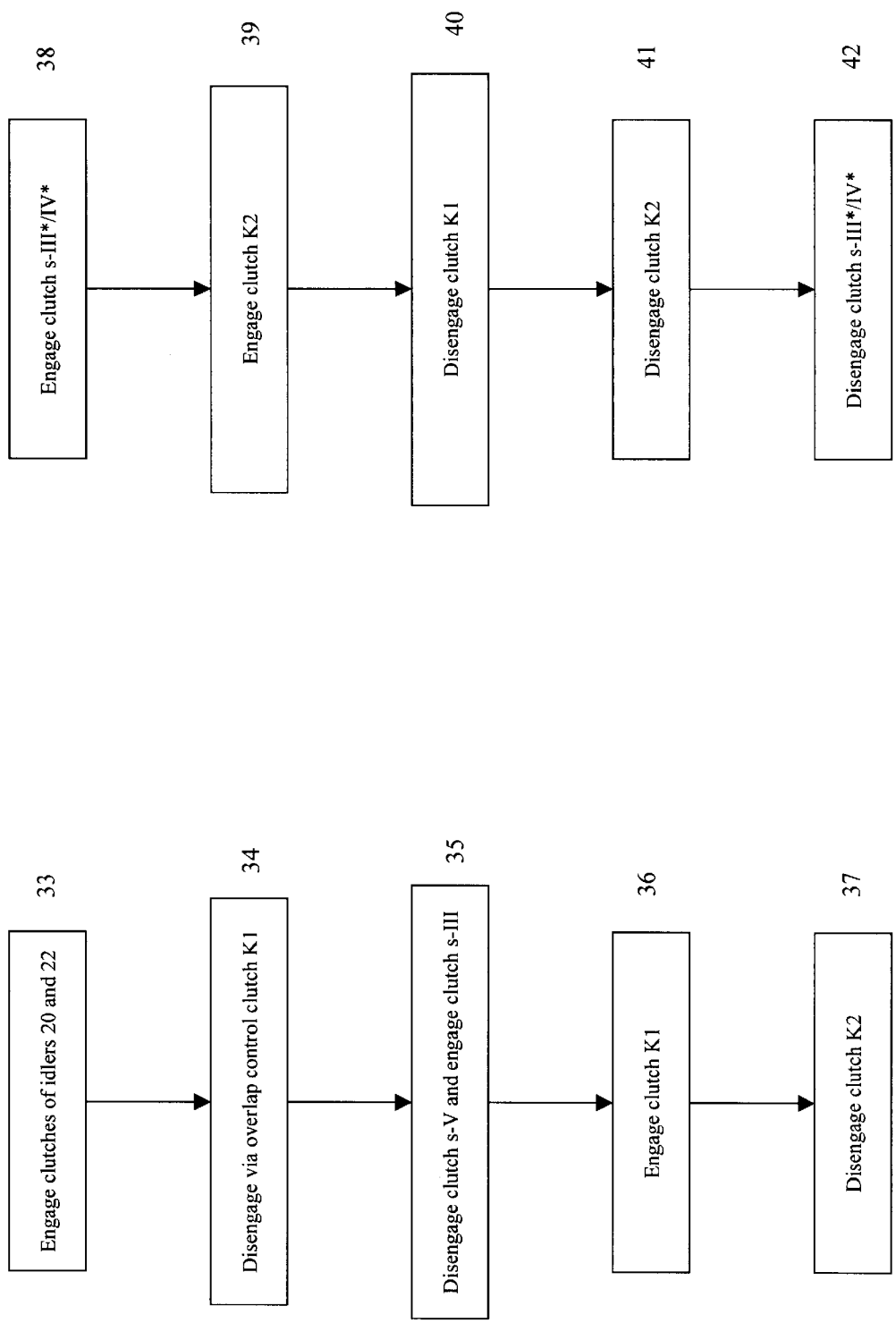

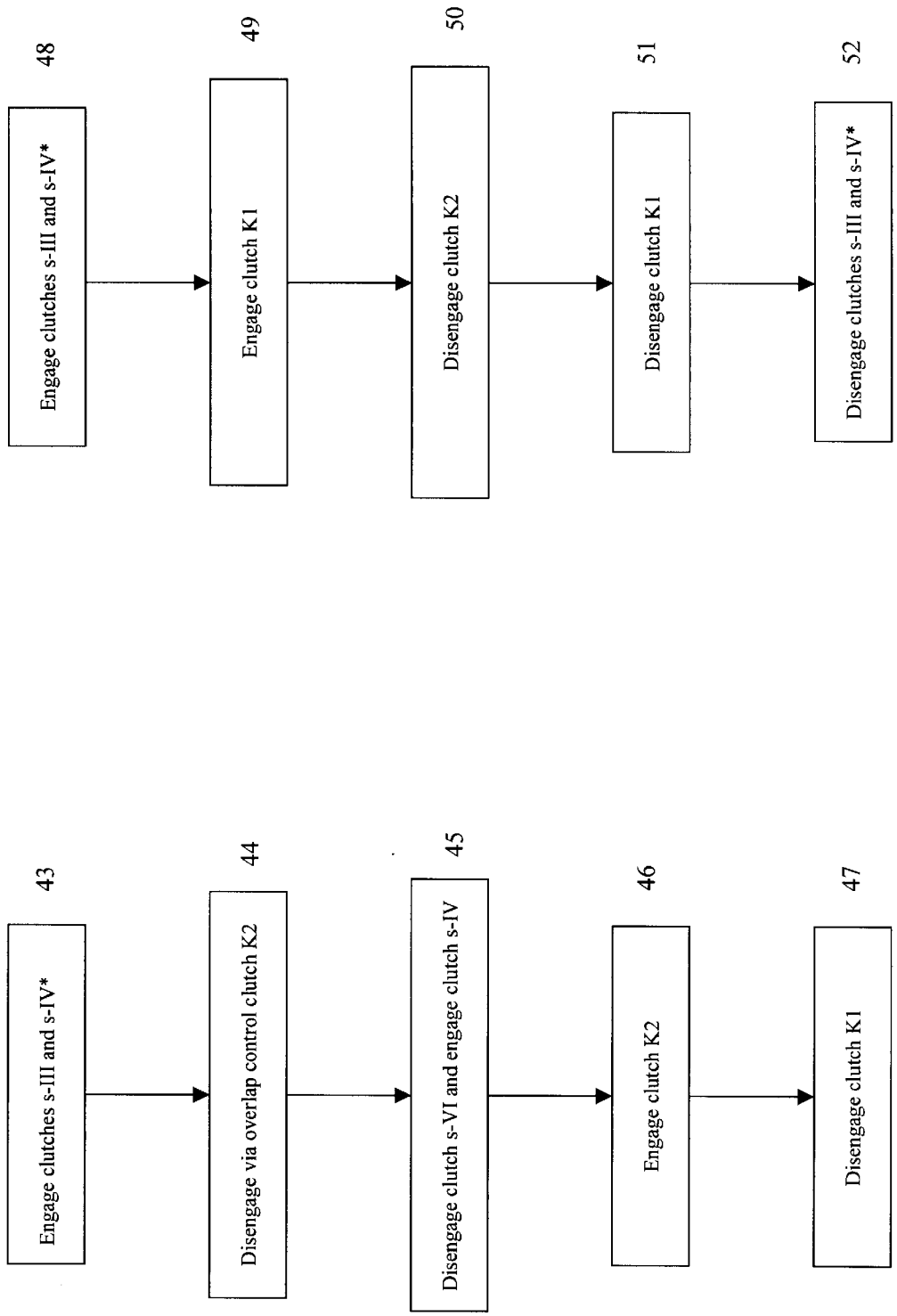

VARIABLE-RATIO GEAR TRANSMISSION HAVING TWO PARTIAL TRANSMISSIONS EACH HAVING A POWERSHIFT CLUTCH

CROSS-REFERENCE TO RELATED APPLICATIONS

This invention relates to the following co-pending application, which is incorporated by reference:

"Gear Changing Transmission Having Two Transmission Groups Arranged Parallel to One Another in the Power Flow", Ser. No. 09/471,559, filed Dec. 23, 1999.

FIELD OF THE INVENTION

The invention concerns a variable-ratio gear transmission (gearwheel manual transmission).

BACKGROUND OF THE INVENTION

In the known variable-ratio gear transmission of the type mentioned above (U.S. Pat. No. 4,658,663), the gear stages for the gears I, III, IV, and R are assigned to the first partial transmission, and the gear stages for the gears II and V and the auxiliary gear stage having the gear ratio of gear III are assigned to the second partial transmission, gear IV being designed as a direct gear and able to be shifted using gear III using a manual transmission clutch in the first partial transmission, as is also provided for the auxiliary gear stage and the gear stage of gear V upon the engagement of a manual transmission clutch in the second partial transmission. For the gear stages assigned to the five forward gears and one reverse gear, for the auxiliary gear stage and the gear constant, a total of seven gear sets are supported next to each other along the common counter shaft, so that this known variable-ratio gear transmission comes to be relatively large in the directions of the transmission shafts.

SUMMARY OF THE INVENTION

The objective underlying the invention is essentially to create a variable-ratio gear transmission of the species for transverse installation in a front-wheel-drive motor vehicle, requiring relatively little space in the directions of the transmission shafts.

The objective mentioned is advantageously achieved in a variable-ratio gear transmission according to the invention, the transmission having two gear stages, which in the known variable-ratio gear transmission are arranged next to each other, being replaced by a single gear set assigned to the two partial transmissions using two gear-type clutches, which in the known transmission are also necessary, so that space is saved in the direction of the transmission shafts.

In the known variable-ratio gear transmission, the important triple shifts between gears II and V are not possible because the assigned gear stages belong to the same second partial transmission, so that power shifts cannot be carried out using overlap (override) control without interruptions in the propulsive power.

In the variable-ratio gear transmission according to the invention, this disadvantage is avoided by a further auxiliary gear stage wherein the auxiliary gear stage is assigned to the first partial transmission.

In the known variable-ratio gear transmission, the important direct shifts between gear III and gear IV are not possible because both the assigned gear stage of gear III as well as the direct coupling of the direct gear=gear IV belong to the same first partial transmission.

In the variable-ratio gear transmission according to the invention, this disadvantage is avoided by the gear stages being assigned to the two partial transmissions in accordance with the changing sequence of gears (I–VI).

In the known variable-ratio gear transmission, the important triple shifts between gears I and IV are not possible because the assigned gear stages belong to one and the same first partial transmission.

In the variable-ratio gear transmission according to the invention, all double and triple shifts are made possible by selecting the gear ratios of the two auxiliary gear stages (ZIII* and ZIV*) to belong to two adjacent gears (III and IV), it being possible to increase the number of gears to six forward gears.

In the variable-ratio gear transmission according to the invention, the installation space in the directions of the transmission shafts is even further significantly reduced by providing an auxiliary countershaft for the auxiliary gear stage (IV*) of the first partial transmission, the auxiliary countershaft being connected to the output shaft by an auxiliary, permanently effective gear constant. Moreover, the installation space in the directions of the transmission shafts is even further significantly reduced by providing the gearwheel, arranged on the auxiliary countershaft, of the auxiliary gear stage (ZIV*) of the first partial transmission configured as an idler which can be coupled to the auxiliary countershaft by a third gear-type clutch (s-IV*) that can be engaged and disengaged.

A design according to the invention for the variable-ratio gear transmission that is even shorter in the directions of the transmission shafts is achieved through providing the idler of the auxiliary gear stage (IV) of the first partial transmission such that the idler engages with a gearwheel, arranged on the intermediate shaft of the first partial transmission, of a gear stage (ZIII) that belongs to the first partial transmission.

In another embodiment of the variable-ratio gear transmission, the two auxiliary gear stages, as well as the gear stage of the first partial transmission having the same gear ratio as the assigned auxiliary gear stage, are combined in a bound gear stage, as a result of which the space required in the directions of the transmission shafts is even further reduced.

In another embodiment of the invention, the auxiliary countershaft is used for the space requirements of the gear stages assigned to the gears, so that, in this respect as well, the variable-ratio gear transmission according to the invention can be accommodated in the axial directions in a narrow space.

In the variable-ratio gear transmission according to the invention having bound gear stages, the gear ratios of the latter are realized by maintaining the ratio (a-III):(a-IV) of the shaft-center distances (a-III and a-IV) of the countershaft (16 and 17) with respect to the input shaft (10) as equal to the ratio of the gear ratios of the auxiliary gear stages (ZIII* and ZIV*).

In the variable-ratio gear transmission according to the invention, through the use of auxiliary gear stages assigned to the partial transmissions, a high quality of shifting is achieved with regard to the double and triple power shifts through engaging the two powershift clutches.

The variable-ratio gear transmission according to the invention can be used for carrying out double shifts between two gears associated with the first partial transmission by virtue of their assigned gear stages through engaging the assigned auxiliary gear stage.

The variable-ratio gear transmission according to the invention can be used for carrying out double shifts between two gears associated with the second partial transmission by virtue of their assigned gear stages through engaging the assigned auxiliary gear stage.

BRIEF DESCRIPTION OF THE DRAWINGS

The invention is further described below on the basis of an exemplary embodiment depicted schematically in the drawing. In the drawing, the following are shown.

FIG. 1 a transmission diagram of a variable-ratio gear transmission having six forward gears and one reverse gear according to the invention in the form of a transmission longitudinal section, FIG. 2 a signal flowchart for the operating sequence of a shifting down from gear V to gear III in the variable-ratio gear transmission of FIG. 1, FIG. 3 a signal flowchart for the operating sequence of a shifting down from gear III to gear I in the variable-ratio gear transmission of FIG. 1, FIG. 4 a signal flowchart for the operating sequence of a shifting down from gear VI to gear IV in the variable-ratio gear transmission of FIG. 1, and FIG. 5 a signal flowchart for the operating sequence of the shifting down from gear IV to gear II in the variable-ratio gear transmission of FIG. 1.

DETAILED DESCRIPTION

In a variable-ratio gear transmission of the present invention, an input shaft is connected to output shaft by two partial transmissions each having an intermediate shaft, and the intermediate shafts are connected to the input shaft each by a powershift clutch. The intermediate shafts are connected for their part to a common countershaft by gear stages that are each associated to one gear, the countershaft being connected to the output shaft by a gear constant. In order to make possible a multiplicity of double shifts while skipping gears, the partial transmissions each have associated to them an auxiliary gear stage, whose gear ratio is equal to the gear ratio of a gear stage belonging, in each case, to the other partial transmission. The auxiliary gear stages are combined into one single gear stage through the mediation of an auxiliary countershaft, so that a main shaft gearwheel, connected by two gear-type clutches to the two intermediate shafts, engages with two idlers mounted, in each case, on one of the countershafts.

With reference first to FIG. 1, in a variable-ratio gear transmission, an input shaft 10 is connected to an output shaft 11 by two partial transmissions 12 and 13, arranged parallel to each other, each having an intermediate shaft 14 and 15, intermediate shafts 14, 15, arranged concentrically with respect to each other, being connected to input shaft 10, in each case, by a frictionally engaged powershift clutch K1 and K2 that can be engaged and disengaged.

Intermediate shaft 14 of first partial transmission 12 is connected to a common countershaft 16 by an auxiliary gear stage ZIII*/III and by an assigned gear stage ZV, and is connected to an auxiliary countershaft 17 by an assigned gear stage ZI and by an assigned auxiliary gear stage ZIV*, in each case, of the first partial transmission 12.

Countershafts 16 and 17 are arranged with respect to input shaft 10 at distance a-III and a-IV, respectively, and are connected to output shaft 11 by gear constants 18 and 19, respectively.

Intermediate shaft 15 of second partial transmission 13 is connected to common countershaft 16 by assigned gear stages ZVI and ZR and is connected to auxiliary countershaft 17 by assigned gear stages ZII and ZIV.

Gear stage ZI is used for creating the gear ratio of gear I and can be shifted by a gear-type clutch s-I into the power flow between powershift clutch K1 and output shaft 11. Gear-type clutch s-I connects an idler 24 that is rotatably arranged on auxiliary countershaft 17 to this shaft, idler 24 engaging with a main shaft gear 28 of gear stage ZI that is arranged concentrically and in a rotationally fixed manner with respect to intermediate shaft 14.

Gear stage ZII is provided for creating the gear ratio of gear II, and can be shifted into the power flow between powershift clutch K2 and output shaft 11 by a gear-type clutch s-II, that can be engaged and disengaged. Gear-type clutch s-II connects auxiliary countershaft 17 to an idler 27 arranged so as to be rotatable and coaxial with respect to the countershaft, idler 27 engaging with a main shaft gear 29 of gear stage ZII, arranged concentrically and in a rotatably fixed manner with respect to intermediate shaft 15.

Gear stage ZIII*/III is used both for creating the gear ratio of gear III in first partial transmission 12 and as auxiliary gear stage having the gear ratio of this gear in second partial transmission 13, two idlers 20 and 22, engaged with each other, being used for this gear stage ZIII*/III, of which one idler 20 is arranged so as to be rotatable and concentric with respect to intermediate shafts 14, 15 and is able to be coupled with the shafts alternately by a first gear-type clutch s-III*/IV, that can be engaged and disengaged, and by a second gear-type clutch s-III, that can be engaged and disengaged.

On the other hand, other idler 22 is arranged so as to be rotatable and concentric with respect to common countershaft 16 and is able to be coupled with the latter by a further gear-type clutch s-III*/III, that can be engaged and disengaged. By engaging first gear-type clutch s-III*/IV*, gear stage ZIII*/III is assigned as auxiliary gear stage of gear III to second partial transmission 13—whereas by engaging second gear-type clutch s-III, it is assigned as gear-specific gear stage to first partial transmission 12. In the latter case, gear III is selected or preselected by engaging a gear-type clutch s-III*/III, that can be engaged and disengaged, connecting idler 22 to common countershaft 16.

Gear stage ZIV is used to form the gear ratio of gear IV and has an idler 26, arranged so as to be rotatable and concentric with respect to auxiliary countershaft 17, as well as a main shaft gear 30 arranged so as to engage with the idler and be rotatably fixed and concentric with respect to intermediate shaft 15. For shifting gear stage ZIV into the power flow between powershift clutch K2 and output shaft 11, idler 26 can be coupled to auxiliary countershaft 17 using a gear-type clutch s-IV, that can be engaged and disengaged.

Gear stage ZV is used to form the gear ratio of gear V and is provided with an idler 23 arranged concentrically and rotatably with respect to common countershaft 16 as well as with main shaft gear 31 arranged so as to engage with the idler and be concentric and rotatably fixed with respect to countershaft 14. For selecting or preselecting gear V, idler 23 can be coupled with countershaft 16 via a gear-type clutch s-V, that can be engaged and disengaged.

Gear stage ZVI is used to form the gear ratio of gear VI and is furnished with an idler 25, that is arranged so as to be rotatable and concentric with respect to common countershaft 16, and with a main shaft gear 32, that is arranged so as to engage with the idler and be rotatably fixed and concentric with respect to countershaft 15. For selecting or preselecting gear VI, idler 25 can be coupled to countershaft 16 by a gear-type clutch s-VI, that can be engaged and disengaged.

Assigned to first partial transmission 12 is an auxiliary gear stage ZIV*, which has an idler 21, arranged so as to be rotatable and concentric with respect to auxiliary countershaft 17, idler 21 being able to be coupled to countershaft 17 by a gear-type clutch s-IV*, that can be engaged and disengaged, as well as engaging with main shaft gear 20 of gear stage ZIII*/III.

Odd gears I, III, and V are assigned by virtue of their gear stages ZIII, ZIV, ZVI to first partial transmission 12 having powershift clutch K1.

Even gears II, IV, and VI are assigned by virtue of their gear stages ZII, ZIV,. ZVI to second partial transmission 13 having powershift clutch K2.

All gear switching between an even and an odd gear is to be carried out directly as a power shift using an overlap control of both powershift clutches K1/K2. By overlap control, a control of the transmitting capacities of both powershift clutches K1/K2 is always meant, such that the sum of the transmitting capacities is maintained roughly constant and the transmitting capacity of the powershift clutch to be disengaged approaches zero.

In the case of a double shifting down between odd gears V and III of first partial transmission 12, in accordance with the signal flowchart of FIG. 2, in response to a switching signal 6, first, in a first method step 33, gear-type clutch s-III*/IV* of idler 20 and gear-type clutch s-III*/III of idler 22 are engaged, and subsequently, in a second method step 34, an overlap control is carried out to disengage powershift clutch K1. Subsequently, gear-type clutch s-V is disengaged in a further method step 35 and gear-type clutch s-III is engaged. Thereafter, in a further method step 36, powershift clutch K1 can be engaged and powershift clutch K2 can be disengaged, subsequently in a further method step 37, or simultaneously along the lines of an overlap control. After powershift clutch K2 is disengaged, gear-type clutch s-III*/IV* can also be disengaged.

In the case of a double shifting down between odd gears III and I in first partial transmission 12, in accordance with the signal flowchart of FIG. 3, in response to the appearance of a switching signal 7, first, in a first method step 38, gear-type clutch s-III*/IV* is again engaged, and subsequently in a further method step 39, powershift clutch K2 is engaged, and thereafter in a further method step 40, or simultaneously, powershift clutch K1 is disengaged along the lines of an overlap control. Thereafter, gear-type clutch s-III is disengaged and gear-type clutch s-I is engaged, whereupon in a further method step 41, an overlap control takes place for disengaging powershift clutch K2 and, in a subsequent method step 42, gear-type clutch s-III*/IV* can be disengaged.

In the case of a double shifting down between even gears VI and IV in second partial transmission 13, in accordance with the signal flowchart of FIG. 4, in response to a switching signal 8, first, in a first method step 43, gear-type clutches s-III and s-IV* are engaged and subsequently, in a further method step 44, an overlap control is carried out for disengaging powershift clutch K2. Subsequently, in a further method step 45, gear-type clutch s-VI can be disengaged and gear-type clutch s-IV can be engaged. Thereafter, powershift clutch K2, in a further method step 46, can be engaged, and, subsequent to a further method step 47, or simultaneously along the lines of an overlap control, powershift clutch K1 can be disengaged. Subsequently, gear-type clutches s-III and s-IV* should be disengaged.

In the case of a double shifting down between even gears IV and II in second partial transmission 13, in accordance with the signal flowchart of FIG. 5, in response to a switching signal 9, first, in a first method step 48, gear-type clutches s-III and s-IV* engaged and simultaneously, or in a further method step 49, powershift clutch K1 is engaged. In a subsequent method step 50, or simultaneously, powershift clutch K2 is disengaged along the lines of an overlap control, whereupon gear-type clutch s-IV is disengaged and gear-type clutch s-II is engaged. Subsequently, in a further method step 51, an overlap control occurs for disengaging powershift clutch K1, so that in a subsequent method step 52, gear-type clutches s-III and s-IV* can be disengaged.

In the case of a double shifting up between gears I and III in first partial transmission 12, first, gear-type clutches s-III*/IV* and s-III*/III are engaged and subsequently an overlap control is carried out for disengaging powershift clutch K1. Thereafter, gear-type clutch s-III is engaged and gear-type clutch s-I is disengaged. Subsequently, powershift clutch K1 is engaged and thereafter or simultaneously powershift clutch K2 is disengaged along the lines of an overlap control. Subsequently, gear-type clutch s-III*/IV* can be disengaged.

In the case of a double shifting up between gears III and V in first partial transmission 12, first, gear-type clutch s-III*/IV* and powershift clutch K2 are engaged, and thereafter, or simultaneously along the lines of an overlap control, powershift clutch K1 is disengaged. Thereafter, gear-type clutch s-III is disengaged and gear-type clutch s-V is engaged. Subsequently, an overlap control takes place for disengaging powershift clutch K2, so that subsequently gear-type clutches s-III*/IV* and s-III*/III can be disengaged.

In the case of a double shifting up between gears II and IV in second partial transmission 13, first, gear-type clutches s-III and s-III*/IV* are engaged and subsequently an overlap control is carried out for disengaging powershift clutch K2. Thereafter, gear-type clutch s-II is disengaged and gear-type clutch s-IV is engaged, so that an overlap control can be carried out for disengaging powershift clutch K1, and gear-type clutches s-III and s-IV* can be disengaged.

In the case of a double shifting up between gears IV and VI in second partial transmission 13, first, gear-type clutches s-III and s-IV* and powershift clutch K1 are engaged and thereafter, or subsequently along the lines of an overlap control, powershift clutch K2 is disengaged. Thereafter, gear-type clutch s-IV is disengaged and gear-type clutch s-VI is engaged, and subsequently an overlap control is carried out for disengaging powershift clutch K1. Subsequently, gear-type clutches s-III and s-IV* can be disengaged.

What is claimed is:

1. A variable-ratio gear transmission, in which an input shaft is connected to an output shaft by two partial transmissions having, in each case, an intermediate shaft, and the intermediate shafts, arranged concentrically with respect to each other, are connected, on the one hand, to the input shaft by a respective frictionally engaged powershift clutch that can be engaged and disengaged, and, on the other hand, to a common countershaft by assigned gear stages for the formation of the gear ratio, in each case, of one gear, the countershaft being connected to the output shaft by a permanently effective gear constant, and in which the gear stage of gear I is assigned to the first partial transmission, whereas the gear stage of gear II and an auxiliary gear stage are assigned to the second partial transmission, and the gear ratio of the auxiliary gear stage of the second partial transmission is equal to the gear ratio of a gear stage of the first partial transmission, and in which the idler of the auxiliary gear stage is arranged so as to be coaxial and rotatable with respect to the intermediate shafts and is able to be coupled to the associated intermediate shaft of the second partial transmission by a first gear-type clutch, and in which the idler of that gear stage of the first partial transmission whose gear ratio is equal to the gear ratio of the auxiliary gear stage of the second partial transmission can be connected by a second gear-type clutch to the associated intermediate shaft of the first partial transmission, comprising:

a single gear stage (ZIII*/III), whose idler, arranged so as to be coaxial and rotatable with respect to the intermediate shafts (14, 15), is connected both to the first gear-type clutch (s-III*/IV*) as well as to the second gear-type clutch (s-III), to provide the auxiliary gear stage (ZIII*) of the second partial transmission (13) with the same gear ratio as the gear stage (ZIII)of the first partial transmission (12).

2. The variable-ratio gear transmission as recited in claim 1, wherein the first partial transmission (12) has assigned to it an auxiliary gear stage (ZIV*), whose gear ratio is equal to the gear ratio of a gear stage (ZIV) of the second partial transmission (13).

3. The variable-ratio gear transmission as recited in claim 1 wherein the gear stages (ZI-ZVI) are assigned to the two partial transmissions (12 and 13) in accordance with the changing sequence of gears (I-VI).

4. The variable-ratio gear transmission as recited in claim 1 wherein the gear ratios of the two auxiliary gear stages (ZIII* and ZIV*) belong to two adjacent gears (III and IV).

5. The variable-ratio gear transmission as recited in claim 1 wherein for the auxiliary gear stage (IV*) of the first partial transmission (12) an auxiliary countershaft (17) is provided which is connected to the output shaft (11) by an auxiliary, permanently effective gear constant (19).

6. The variable-ratio gear transmission as recited in one of claims 2 through 5, wherein the gearwheel (21), arranged on the auxiliary countershaft (17), of the auxiliary gear stage (ZIV*) of the first partial transmission (12) is configured as an idler and can be coupled to the auxiliary countershaft (17) by a third gear-type clutch (s-IV*), that can be engaged and disengaged.

7. The variable-ratio gear transmission as recited in claim 6, wherein the idler (21) of the auxiliary gear stage (IV) of the first partial transmission (12) engages with a gearwheel (20), arranged on the intermediate shaft (14) of the first partial transmission (12), of a gear stage (ZIII) that belongs to the first partial transmission (12).

8. The variable-ratio gear transmission as recited in claim 1, wherein the gearwheel (20) that engages with the idler (21) of the auxiliary gear stage (ZIV*) of the first partial transmission (12) belongs to that single gear stage (ZIII*/III) which is provided both for the auxiliary gear stage (ZIII*) of the second partial transmission (13) as well as for the gear stage (ZIII) of the first partial transmission (12), having the same gear ratio.

9. The variable-ratio gear transmission as recited in claim 5, wherein the auxiliary countershaft (17) is connected to the intermediate shaft (14) of the first partial transmission (12) by at least one (ZI) of the gear stages (ZI, ZV) of the first partial transmission (12).

10. The variable-ratio gear transmission as recited in claim 5, wherein the auxiliary countershaft (17) is connected to the intermediate shaft (15) of the second partial transmission (13) by at least one (ZII,ZIV) of the gear stages (ZII, ZIV, ZVI and ZR) of the second partial transmission (13).

11. The variable-ratio gear transmission as recited in claim 5, wherein the ratio (a-III):(a-IV) of the shaft-center distances (a-III and a-IV) of the countershaft (16 and 17) with respect to the input shaft (10) is equal to the ratio of the gear ratios of the auxiliary gear stages (ZIII* and ZIV*).

12. A method for shifting a variable-ratio gear transmission between two gears associated by virtue of their gear stages to a first partial transmission, of which a new gear has a gear ratio of an auxiliary gear stage of a second partial transmission, comprising the steps of:

engaging a first gear-type clutch (s-III*/IV*) connecting the idler (20) and arranged so as to be coaxial and rotatable with respect to the intermediate shafts (14, 15) of the auxiliary gear stage (ZIII*/III) of the second partial transmission (13) to the intermediate shaft (15) of the second partial transmission (12) and a fourth gear-type clutch (s-III*/III), connecting a further idler (22) of the auxiliary gear stage (ZIII*/III) of the second partial transmission (13) to the common countershaft (16);

controlling via overlap control the transmitting capacities of the two powershift clutches (K1 and K2) such that the sum of the transmitting capacities is kept roughly constant and the transmitting capacity of the powershift clutch (K1) of the first partial transmission (12) approaches zero;

disengaging a fifth gear-type clutch (s-V), connecting an idler (23) of the gear stage (ZV) of the old gear (V) to its shaft (common countershaft 16);

engaging a second gear-type clutch (s-III), connected to the idler (20) and arranged so as to be coaxial and rotatable with respect to the immediate shafts (14, 15) of the auxiliary gear stage (ZIII*/III) of the second partial transmission (13);

engaging the powershift clutch (K1) of the first partial transmission (12);

disengaging along the lines of an overlap control, the powershift clutch (K2) of the second partial transmission (13); and disengaging the first gear-type clutch (s-III*/IV*).

13. A method for shifting a variable-ratio gear transmission, between two gears, associated by virtue of their gear stages to the first partial transmission, of which the old gear has the gear ratio of the auxiliary gear stage of the second partial transmission, comprising the steps of:

engaging a first gear-type clutch (s-III*/IV*) connecting the idler (20) and arranged so as to be coaxial and rotatable with respect to the intermediate shafts (14, 15) of the auxiliary gear stage (ZIII*/III) of the second partial transmission (13) to the intermediate shaft (15) of the second partial transmission (13);

engaging the powershift clutch (K2) of the second partial transmission (13);

disengaging, along the lines of an overlap control, the powershift clutch (K1) of the first partial transmission (12) and then the second gear-type clutch (s-III);

engaging a gear-type clutch (s-I), connected to an idler (24) of the gear stage (ZI) of the new gear (I);

disengaging via overlap control the powershift clutch (K2) of the second partial transmission (13); and disengaging the first and fourth gear-type clutch (s-III*/IV* and s-III*/III), connected to a respective idler (20 and 22) of the auxiliary gear stage (ZIII*/III) of the second partial transmission (13).

14. A method for shifting a variable-ratio gear transmission between two gears assigned by virtue of their gear stages to a second partial transmission, of which the new gear has the gear ratio of the auxiliary gear stage of the first partial transmission, comprising the steps of:

engaging a first gear-type clutch (s-III*/IV*) which is connected to the idler (20) and arranged so as to be coaxial and rotatable with respect to the intermediate shafts (14, 15) of the auxiliary gear stage (ZIV*) of the first partial transmission (12) and the third gear-type clutch (s-IV*), connecting the auxiliary countershaft (17) to an idler (21) of the auxiliary gear stage (ZIV*) of the first partial transmission (12);

disengaging via overlap control the powershift clutch 28 (K2) of the second partial transmission (13);

disengaging a gear-type clutch (s-VI) connecting an idler (25) of the gear stage (ZVI) of the old gear (VI) to its shaft (common countershaft 16);

engaging a gear-type clutch (s-IV) connecting an idler (26) of the gear stage (ZIV) of the new gear (VI) to its shaft (auxiliary countershaft 17); and disengaging the powershift clutch (K2) of the second partial transmission (13) and the first gear-type clutch (s-III*/IV*).

15. A method for shifting a variable-ratio gear transmission between two gears assigned by virtue of their gear stages to a second partial transmission, of which the old gear has the gear ratio of the auxiliary gear stage of the first partial transmission, comprising the steps of:

engaging the first gear-type clutch (s-ZIII*/IV*) which is connected to the idler (20) and arranged so as to be coaxial and rotatable with respect to the intermediate shafts (14, 15) of the auxiliary gear stage (ZIV*) of the first partial transmission (12) and the third gear-type clutch (s-IV*), connecting the auxiliary countershaft (17) to an idler (21) of the auxiliary gear stage (ZIV*) of the first partial transmission (12);

engaging a powershift clutch (K1) of the first partial transmission (12)

disengaging via overlap control the powershift clutch (K2) of the second partial transmission (13);

disengaging a gear-type clutch (s-IV), connected to an idler (26) of the gear stage (ZIV) of the old gear (IV), engaging a gear-type clutch (s-II), connected to an idler (27) of the gear stage (ZII) of the new gear (II), disengaging via overlap control the powershift clutch (K1) of the first partial transmission (12) and then the first and third gear-type clutch (s-III*/IV* and s-IV*), connected to a respective idler (20 and 21) of the auxiliary gear stage (ZIV*) of the first partial transmission (12).

* * * * *